3,300,466
PROCESS OF PRODUCING CRYSTALLINE SYNDYOTACTIC 1,2-POLYBUTADIENE
Gerlando Marullo, Umberto Maffezzoni, and Ermanno Susa, all of Milan, Italy, assignors to Montecatini Edison S.p.A., Milan, Italy
Filed Nov. 15, 1960, Ser. No. 69,412
The portion of the term of the patent subsequent to May 4, 1982, has been disclaimed
13 Claims. (Cl. 260—94.3)

This invention relates to a process for polymerizing 1,3-butadiene to high polymers having a regular structure.

More particularly it relates to a process which makes possible the production of crystalline 1,3-butadiene polymers which have almost exclusively a syndyotactic structure and 1,2-linkages.

The production of these polymers possessing this high degree of steric purity, i.e., practically free from other polymer molecules possessing different linkages, is achieved by using as polymerization catalysts either a catalyst comprising a halogen-free compound of a group 8 metal of the Mendeléeff Periodic Table and an aluminum trialkyl or a catalyst comprising a halogen-free compound, of a group 8 metal of the Mendeléeff Periodic Table and a mixture containing an aluminum trialkyl and a dialkyl aluminum monohalide, said aluminum trialkyl and dialkyl aluminum monohalide being present in certain molar ratios.

Figure 1:
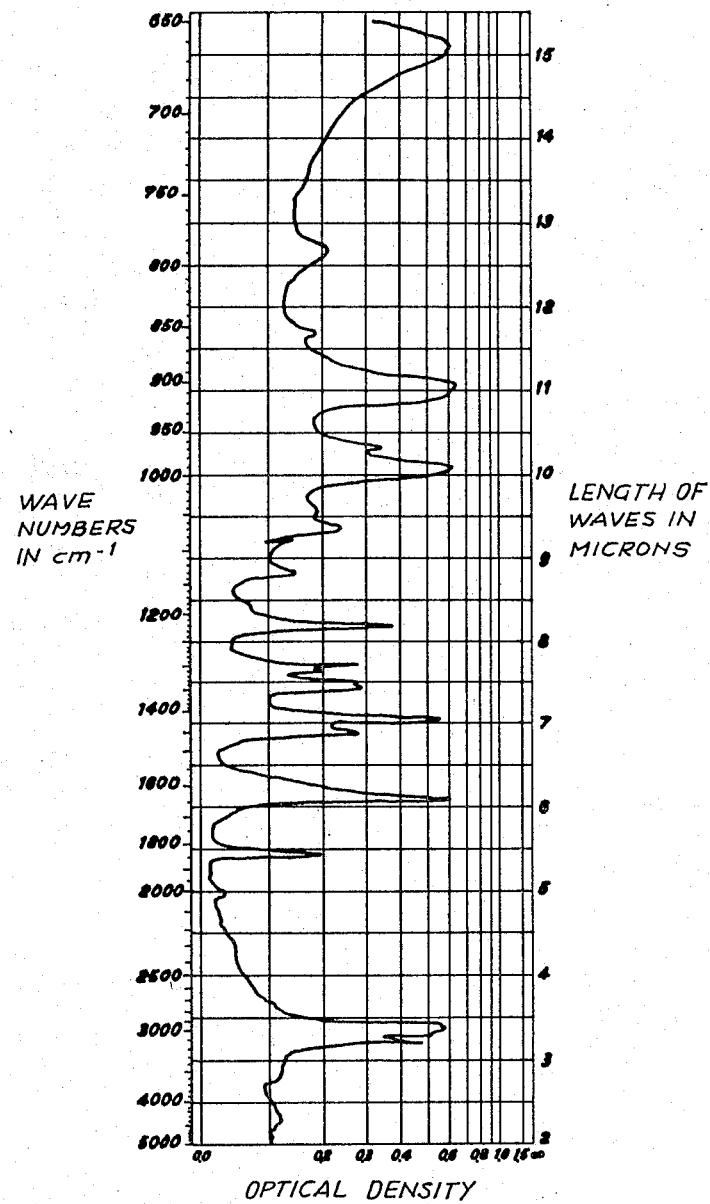
FIGURE 1 is a graphic representation of the spectral lines shown by samples of the polymers produced according to the process of the present invention upon infrared spectographic examination.

It is accordingly an object of this invention to provide an improved process for the polymerization of 1,3-butadiene to obtain crystalline polymers having substantially only a syndyotactic 1,2-structure.

In a planar representation this structure is pictured as a succession of the following groups:

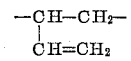

in which the vinyl groups are alternatively below and above the plane upon which the principal polymer chain is supposedly stretched.

It is well known that the course of the polymerization process as well as the characteristics of the polymer produced depend upon the nature of the metal compound and organometallic compound used as the catalyst.

Thus by polymerizing butadiene in the presence of a catalyst containing a group 8 metal compound, such as a cobalt compound, and an alkyl aluminum halide, in any ratio of aluminum to group 8 metal, polymers having a substantially cis-1,4-structure are obtained.

It is also known that a polymer of same cis-1,4-structure can be obtained using a catalyst containing a group 8 metal compound, such as cobalt chlorides or bromides, and an aluminum trialkyl, provided that aluminum to cobalt molar ratios lower than 1 are used and this catalytic mixture, prior to its use, is aged for several hours until its color changes from blue to black.

It has been found according to one aspect of the present invention that by operating with a catalyst containing a halogen-free compound of a group 8 metal and a trialkyl aluminum compound, it is possible to obtain high yields of a crystalline butadiene polymer having a very high content of polymer molecules with a syndyotactic 1,2-structure. Compounds of group 8 metals which are suitable for use in this catlayst are exemplified by organic or inorganic metal salts either soluble or insoluble in hydrocarbons e.g., sulfates, phosphates, nitrates, carbonates, sulfides, cyanides, xanthates, acetates, propionates, butyrates, oxalates, 2-ethylhexanoates, acetylacetonates, benzoates, stearates, naphthenates and various other organic or inorganic metal salts particularly but not exclusively those salts in which the group 8 metal possesses a valence less than its highest valence. Other suitable compounds of group 8 metals also include soluble complexes of cobalt nickel, platinum or palladium salts, which salts are complexed with organic nitrogen bases such as pyridine or some other complex forming substance, such as pyrrole, morpholine, aliphatic primary, secondary and tertiary amines, nitriles, amides, alcohols, ketones, or phosphorus containing compounds, such as phosphines and alkyl phosphates or phosphites. These complexes are prepared in general by suspending the metal salt in benzene and adding the complexing agent to the suspension. After stirring the suspension is filtered, and the clear solution containing the complex is used.

As the other catalytic component, any aluminum trialkyl may be used, preferably those containing alkyl groups with 1 to 5 carbon atoms, such as trimethyl, triethyl, tripropyl, triisobutyl, etc.

Any molar ratio of aluminum/group 8 metal can be employed. When using ratios varying from 0.3 to 500, there is obtained substantially pure syndyotactic-1,2-polybutadiene; however, when high aluminum/group 8 metal ratios (above 4) are employed, the catalyst rapidly loses its activity. Thus in such cases the butadienes monomer, or at least a portion thereof, must be introduced either before, together with or immediately after the addition of the trialkyl aluminum to the group 8 metal compound.

It has also been found, according to another aspect of the present invention, that crystalline polybutadiene possessing a syndyotactic 1,2-structure can be obtained by employing a polymerization catalyst containing a halogen-free compound of a group 8 metal of the Mendeléeff Periodic Table and a mixture of a trialkyl aluminum and a dialkyl aluminum monohalide, where the molar ratio of trialkyl aluminum/dialkyl aluminum monohalide (AlR₃/AlR'₂X; R and R' each represents an alkyl group either the same or different from each other, X represents a halogen) is at least 0.8:1.

These particular catalysts possess a high catalytic activity so that not only are syndyotatic-1,2-polybutadienes produced in a high degree of steric purity but the use of these catalysts makes possible a high polymerization rate.

The highest catalytic activity is obtained when the molar percentage of AlR'₂X in the AlR₃+AlR₂X mixture is maintained between a minimum of about 10 percent and a maximum of about 50 percent. Above this maximum value, the activity of the catalyst decreases rapidly and becomes almost nil with a further increase of the AlR₂X. By operating in this range of about 10 to 50 percent of AlR'₂X based on the total mols of organometallic component in the catalyst mixture, there is obtained polymers having a higher crystallinity than polymers obtained using only trialkyl aluminum as the organometallic component under same conditions.

The AlR₃/AlR'₂X molar ratio is preferably kept around 1:1.

At percentage of AlR'₂X higher than 55%

(AlR₃/AlR'₂X ratios below 0.8:1) there is a progressive variation in the stereospecificity of the catalysts so that the polymers produced contain increasing proportions of chains having cis-1,4-structure in proportion to the increase in the amount of AlR'₂X added.

The dialkyl aluminum monohalide (AlR'₂X) may be introduced into the reaction system in any suitable manner, either before, simultaneously with or after the introduction of trialkyl aluminum compound. In all cases an increase in activity of the catalysts so obtained is noted; however, the best results are attained by adding previously prepared mixtures of the two organometallic components to the reaction system.

The preferred dialkyl aluminum monohalides used in the catalyst are diethyl aluminum monochloride and diisobutyl aluminum monochloride; dialkyl halides with up to 5 carbon atoms in the alkyls may be used.

Any aluminum trialkyl may be used as the trialkyl aluminum compound; especially those containing alkyl groups with 1 to 5 carbon atoms and preferably triethyl and triisobutyl groups.

Any group 8 metal compound previously disclosed as suitable for use with the catalyst having trialkyl aluminum as the sole organometallic component, such as complexes of group 8 metal compounds with organic nitrogen bases, i.e. pyridine, may also be used with this

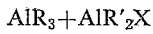

containing catalyst.

The polymerization process of the present invention, using the group 8 metal compounds with either AlR₃ or the AlR₃+AlR₂X mixtures, may be carried out in a batch or continuous manner at a temperature range of —25° C. to +30° C., preferably at room temperature.

The polymerization is preferably carried out in the presence of conventional inert solvents such as an aromatic hydrocarbon e.g., benzene, toluene, xylene etc., or a mixture or aromatic and aliphatic hydrocarbons. A solvent is considered inert when it will not destroy the polymerization catalyst.

Butadiene itself may also be used as the solvent.

The polymers produced by the process of the present invention have a wide variety of uses such as in the production of manufactured articles, films and fibers, all possessing interesting mechanical and chemical properties due in part to their content of reactive vinyl groups.

The following examples are given to illustrate the present invention without limiting its scope.

*Example 1*

In a 2000 cc. autoclave, provided with an agitator and a cooling jacket, cleaned, dried and evacuated, are introduced 800 cc. of benzene and 10 cc. of a benzene solution of a cobalt stearate-pyridine complex (cobalt stearate—2(C₅H₅N)), having a concentration of 0.365 g. of Co per liter. Successively 100 g. of 1,3-butadiene (98.5% pure) are added while agitating the mixture. Immediately thereafter 3.8 g. of Al(C₂H₅)₃, diluted with 190 cc. of benzene, are added, thus giving an Al/Co molar ratio of 550.

Agitation is continued for 15 hours while maintaining the inside temperature at 16° C. Polymerization is stopped by adding 200 cc. of methanol, containing a conventional antioxidant (phenyl-beta-naphthylamine) and the polymer formed is dried at 50° C. under vacuum.

38 g. of a product polymer in powder form are obtained.

Samples of the polymer product in the form of a lamina obtained by cold pressing are subjected to infrared spectrographic examination (Perking-Elmer Infrared Spectrophotometer, Model 21). This examination, the results of which are graphically represented in FIGURE 1, shows that the polymer is syndyotatic-1,2-polybutadiene.

The spectrum obtained shows all the bands characteristic of the vinyl bond (R—CH=CH₂) and shows specifically those at 908 and 990 cm.⁻¹ (CH bending outside the plane), 1640 cm.⁻¹ (stretching C=C), 1830 cm.⁻¹ (harmonic of the bending vibrations outside the plane) and at 3075–3090 cm.⁻¹ (stretching C—H). Moreover, the presence of the absorption band at about 660 cm.⁻¹ clearly shows the syndyotactic character of the polymer.

The absence of bands characteristic of the cis-1,4 and trans-1,4-structures shows that the unsaturation is of the vinyl type.

The polymer product was subjected to X-ray examination employing a diffractometer with a Gieger counter. The radiation used was that of CuKα.

Figure 2:
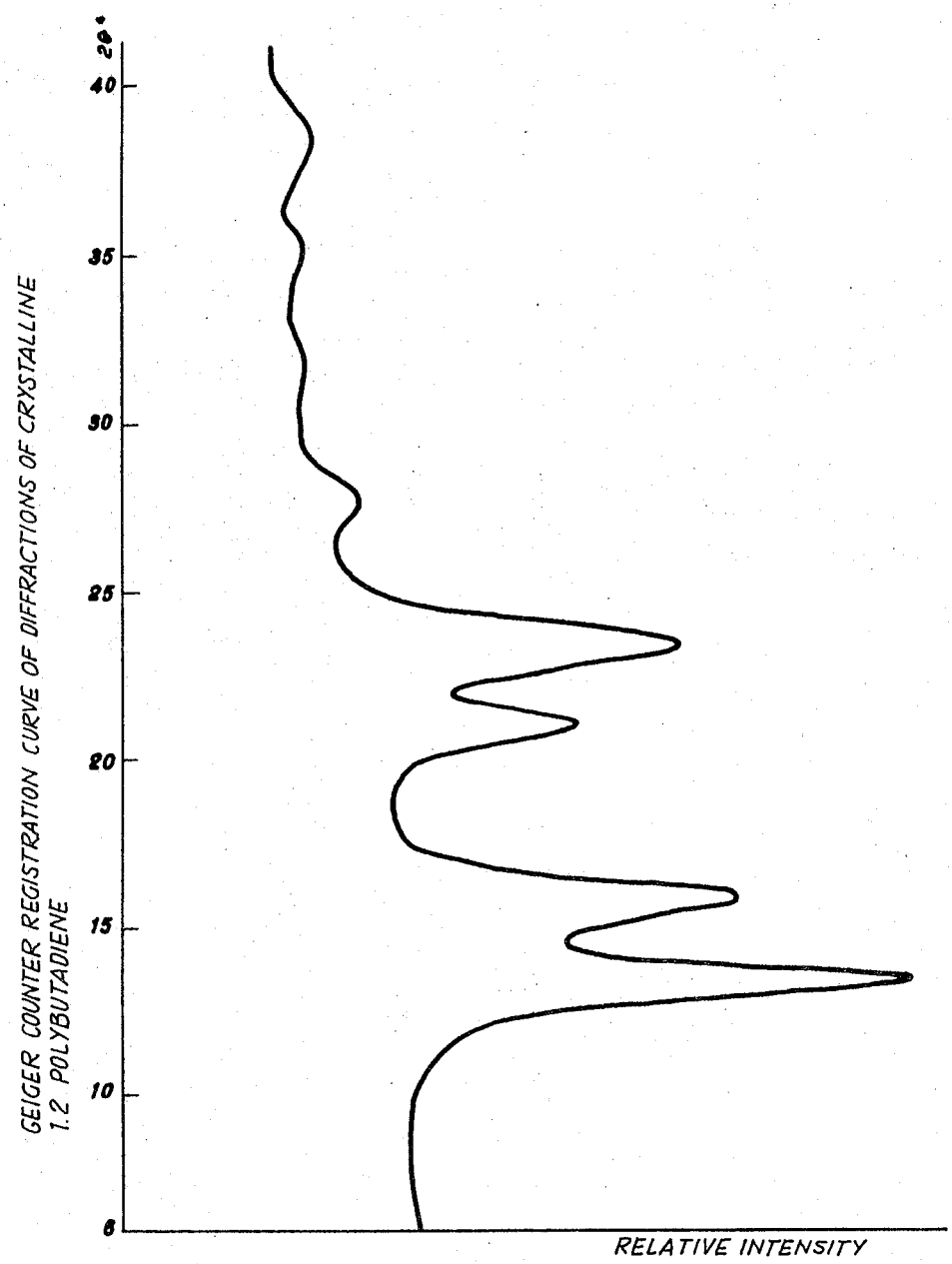
FIGURE 2 is a registration curve of the diffractions given upon X-ray examination of samples of the polymers produced according to the present invention.

The spectrum obtained presents all and only the crystalline reflections of syndyotactic 1,2-polybutadiene, as shown by FIGURE 2.

The crystallinity of the product is high (above 76%) which demonstrates that the product sample is pure and has a highly regular structure.

The polymer is subjected to selective solvent extraction in the absence of air and gives a 0.87% acetone extract and a 0.4% benzene extract. The residue, by X-ray examination, shows a crystallinity of 81.6%.

*Example 2*

The polymerization is carried out as in Example 1 but the butadiene and the benzene solution of Al(C₂H₅)₃ are introduced at the same time, The polymerization is stopped after 15 hours by adding methanol containing an antioxidant.

The dry polymer (20 g.) shows a syndyotactic-1,2 structure and, by X-ray examination, gives a crystallinity of 80.1%.

*Example 3*

The polymerization is carried out by operating as in Example 1, but adding butadiene immediately after introduction of the solution of Al(C₂H₅)₃ in benzene. The polymerization is stopped after 15 hours by addition of methanol containing an antioxidant and the polymer obtained is dried at 50° C. under vacuum.

The dry polymer (31 g.) has a syndyotactic-1,2 structure, and shows a crystallinity of 79.6% by X-ray examination.

*Example 4*

The polymerization is carried out as in Example 1 but using 30 cc. of the same benzene solution of the cobalt-stearate-pyridine complex (Al/Co molar ratio = 180).

The reaction is stopped by adding methanol containing an antioxidant and the polymer is dried at 50° C., under vacuum. The polymer thus obtained (18 g.) has a syndyotactic-1,2 structure, and shows a crystallinity of 75% by X-ray examination.

*Example 5*

The polymerization is carried out as in Example 1 with the exception that the same molar amount of cobalt acetylacetonate dissolved in benzene is used in place of the cobalt-stearate-pyridine complex. The reaction is stopped after 15 hours by adding methanol containing an antioxidant and the polymer is dried at 50° C. under vacuum. The polybutadiene thus obtained (14 g.) has a syndyotactic-1,2 structure and shows a crystallinity of 76.5% by X-ray examination.

*Example 6*

(a) The polymerization is carried out as in Example 1, but 0.0416 mol of anhydrous cobalt phosphate without any complexing agent, the same amount of solvent (1000 cc. of benzene) and 0.0143 mol of Al(iC₄H₉)₃ are employed (Al/Co molar ratio of 0.34).

The reaction is stopped after 20 hours by addition of methanol containing an antioxidant and the polymer is dried at 50° C. under vacuum. The polybutadiene thus obtained (20.5 g.) has a syndyotactic-1,2 structure and shows a crystallinity of 73% by X-ray examination.

(b) The polymerization is carried out as in (a), but the catalyst is aged for 2 hours before adding butadiene.

The reaction is stopped and the polymer recovered as in (a). The polybutadiene thus obtained 41 g.) with syndyotactic-1,2 structure, presents a crystallinity of 72% by X-ray examination.

*Example 7*

(a) The polymerization is carried out as in Example 1 with the same amount of solvent (1000 cc. of benzene), and 0.0199 mol of Al(iC$_4$H$_9$)$_3$, but the cobalt compound is replaced with 0.058 mol of anhydrous CoSO$_4$ without any complexing agent (Al/Co molar ratio = 0.34). The polymerization action is stopped after 20 hours by adding methanol containing an antioxidant and the polymer is dried at 50° C., under vacuum. The polybutadiene thus obtained, has a syndyotactic-1,2 structure and shows a crystallinity of 72% by X-ray examination.

(b) The polymerization is carried out as in (a), but the catalyst is aged for 6 hours before introducing butadiene. The reaction is stopped and the polymer recovered as in (a). The polybutadiene thus obtained, with syndyotactic-1,2 structure, presents a crystallinity of 71% by X-ray examination.

*Example 8*

The polymerization is carried out by operating as in Example 1, with the exception that 268 cc. of cobalt stearate-pyridine complex solution (Al/Co molar ratio 20) are used. The polymerization is stopped by adding methanol containing an antioxidant and the polymer thus obtained is dried at 50° C. under vacuum. The dry polymer (8 g.) has a syndyotactic-1,2 structure and shows a crystallinity of 55% by X-ray examination.

*Example 9*

The polymerization is carried out as in Example 1. The total charge comprises: benzene 1000 cc., cobalt-stearate-pyridine complex 0.123 millimol, Al(C$_2$H$_5$)$_3$ 33.4 millimols, butadiene 100 g. (Al/Co molar ratio of 270). Agitation is continued for 1 hour at 15° C. The dry polymer (17.8 g.) has a syndyotactic-1,2 structure and shows a crystallinity of 73.7% by X-ray examination.

Carrying out the polymerization in the same way, but using a mixture of 16.7 millimols Al(C$_2$H$_5$)$_3$ and 16.7 millimols Al(C$_2$H$_5$)$_2$Cl as the organometallic component in place of the Al(C$_2$H$_5$)$_3$ alone, there are obtained 27 g. of a polymer, having a syndyotactic-1,2 structure and a crystallinity of 75%.

*Example 10*

The polymerization is carried out as in Example 1. The total charge comprises: benzene 1000 cc., cobalt acetylacetonate 0.0769 millimol, Al(C$_2$H$_5$)$_3$ 33.5 millimols, butadiene 100 g. (Al/Co molar ratio of 430). Agitation is continued for 1 hour at 15° C. The dry polymer (16.2 g) has a syndyotactic-1,2 structure and shows a crystallinity of 70%.

Carrying out the polymerization in the same way, but using a mixture of 16.7 millimols Al(C$_2$H$_5$)$_3$ and 16.7 millimols Al(C$_2$H$_5$)$_2$Cl as the organometallic component, in place of the Al(C$_2$H$_5$)$_3$ alone, there are obtained 44 g. of a polymer, having a syndyotactic-1,2 structure and a crystallinity of 72%.

Variations can of course be made from the above disclosure without departing from the spirit of the present invention.

Having described the present invention what is desired to secure and claim by Letters Patent is:

1. A process for producing crystalline polybutadiene having predominantly syndyotactic-1,2 structure, which comprises polymerizing 1,3-butadiene in the presence of a catalyst consisting essentially of (1) a halogen-free cobalt compound selected from the group consisting of cobalt-stearate-pyridine complex, cobalt acetylacetonate, cobalt phosphate and cobalt sulfate and (2) a mixture of compounds of the formulae AlR$_3$ and AlR'$_2$X in an AlR$_3$/AlR'$_2$X molar ratio of AlR'$_2$X is from about 10 to about 50% based on the total mols of organometallic component in the catalyst mixture wherein R and R' each represents an alkyl group containing from 1 to 5 carbon atoms and X represents a halogen atom, the molar ratio of aluminum to halogen-free cobalt compound being from 0.3 to 500.

2. A process according to claim 1, wherein the cobalt compound is anhydrous cobalt phosphate.

3. A process according to claim 1, wherein the cobalt compound is anhydrous cobalt sulfate.

4. A process according to claim 1, wherein the AlR$_3$/AlR'$_2$X molar ratio is about 1:1.

5. A process according to claim 1, wherein R and R' are each selected from the group consisting of ethyl and isobutyl groups.

6. A process according to claim 1, wherein X is chlorine.

7. A process according to claim 1, wherein the AlR'$_2$X compound is Al(C$_2$H$_5$)$_2$Cl and the AlR$_3$ compound is selected from the group consisting of Al(C$_2$H$_5$)$_3$ and Al(i-C$_4$H$_9$)$_3$.

8. A process according to claim 1, wherein cobalt acetyl-acetonate is used.

9. A process according to claim 1, wherein a cobalt stearate pyridine complex is used.

10. A process according to claim 1, wherein the polymerization is carried out at temperateure from −25° C. to +30° C.

11. A process according to claim 1, wherein the polymerization is carried out at room temperature.

12. A process according to claim 1, wherein the polymerization is carried out in the presence of an inert solvent.

13. A process according to claim 1, wherein the polymerization is carried out in the presence of a solvent selected from the group consisting of aromatic hydrocarbons and a mixture of aromatic and aliphatic hydrocarbons.

References Cited by the Examiner

UNITED STATES PATENTS

| | | | |
|---|---|---|---|
| 2,954,367 | 9/1960 | Vandenburg | 260—94.9 |
| 2,977,349 | 3/1961 | Brockway | 260—94.3 |
| 3,094,514 | 6/1963 | Tucker | 260—94.3 |

FOREIGN PATENTS

| | | |
|---|---|---|
| 221,121 | 3/1959 | Australia. |
| 556,629 | 10/1957 | Belgium. |
| 573,680 | 12/1958 | Belgium. |
| 849,589 | 9/1960 | Great Britain. |
| 587,968 | 1/1959 | Italy. |
| 594,618 | 6/1959 | Italy. |
| 1,196,658 | 11/1959 | France. |
| 1,215,953 | 4/1960 | France. |

JOSEPH L. SCHOFER, *Primary Examiner.*

M. LIEBMAN, *Examiner.*

M. JACOBS, E. J. SMITH, *Assistant Examiners.*

UNITED STATES PATENT OFFICE
CERTIFICATE OF CORRECTION

Patent No. 3,300,466                                            January 24, 1967

Gerlando Marullo et al.

It is certified that error appears in the above identified patent and that said Letters Patent are hereby corrected as shown below:

In the heading to the printed specification, between lines 9 and 10, insert -- Claims priority, application Italy, Nov. 18, 1959, 19,154/59; Apr. 5, 1960, 5,953/60 --.

Signed and sealed this 3rd day of March 1970.

(SEAL)
Attest:

Edward M. Fletcher, Jr.                                WILLIAM E. SCHUYLER, JR.
Attesting Officer                                                Commissioner of Patents